United States Patent
Jun (10) Patent No.: US 8,230,287 B2
(45) Date of Patent: *Jul. 24, 2012

(54) IMAGE DATA TEST UNIT, IMAGE APPARATUS HAVING THE SAME, AND METHOD OF TESTING IMAGE DATA USING THE SAME

(75) Inventor: Hyun-Su Jun, Seongnam-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,430

(22) Filed: Sep. 16, 2011

(65) Prior Publication Data

US 2012/0002886 A1    Jan. 5, 2012

Related U.S. Application Data

(62) Division of application No. 12/358,589, filed on Jan. 23, 2009, now Pat. No. 8,046,654.

(30) Foreign Application Priority Data

Jan. 25, 2008  (KR) .............................. 2008-0008155

(51) Int. Cl.
G01R 31/28    (2006.01)

(52) U.S. Cl. ........................................ 714/742; 714/736
(58) Field of Classification Search ................. 714/736, 714/742, 741, 724, 799
See application file for complete search history.

(56) References Cited

U.S. PATENT DOCUMENTS

| | | | |
|---|---|---|---|
| 7,000,224 B1 | 2/2006 | Osborne, II et al. | |
| 7,050,751 B2 * | 5/2006 | Watanabe et al. | 399/391 |
| 7,093,249 B2 | 8/2006 | Melamed | |
| 8,046,654 B2 * | 10/2011 | Jun | 714/742 |
| 2008/0052126 A1 * | 2/2008 | Sasai et al. | 705/3 |

FOREIGN PATENT DOCUMENTS

KR    1020050077296    8/2005

* cited by examiner

*Primary Examiner* — Phung M Chung
(74) *Attorney, Agent, or Firm* — Stanzione & Kim, LLP (57) ABSTRACT

An image data test unit includes a data acquisition unit configured to acquire image data having individual frames, an image data temporary storage unit configured to receive the acquired image data from the data acquisition unit to store a certain amount of the image data, and a test calculation unit configured to sequentially receive the image data from the image data temporary storage unit to store a certain amount of the image data, and compare the stored image data with pre-set test elements. In addition, an image apparatus having the image data test unit and a method of testing image data using the image data test unit are also provided.

10 Claims, 8 Drawing Sheets

IMAGE DATA TEST UNIT, IMAGE APPARATUS HAVING THE SAME, AND METHOD OF TESTING IMAGE DATA USING THE SAME

CROSS-REFERENCE TO RELATED APPLICATIONS

This application is a Divisional Application of prior application Ser. No. 12/358,589, now U.S. Pat. No. 8,046,654, filed on Jan. 23, 2009 in the United States Patent and Trademark Office, which claims the benefit of Korean Patent Application No. 10-2008-0008155, filed Jan. 25, 2008, the contents of which are hereby incorporated herein by reference in its entirety.

BACKGROUND

1. Field of the Invention

Example embodiments relate to an image apparatus, and more particularly, to an image data test unit capable of temporarily storing a certain amount of image data and transmitting the temporarily stored image data to a test execution unit to temporarily store the data therein, and testing the temporarily stored image data in the test execution unit to output results of the image data corresponding to individual frames, an image apparatus having the same, and a method of testing image data using the same.

2. Description of the Related Art

Typically, a test apparatus is used to test image data in order to compare a series of image data with pre-set reference specifications and process differences or similarities therebetween.

Figure 1:
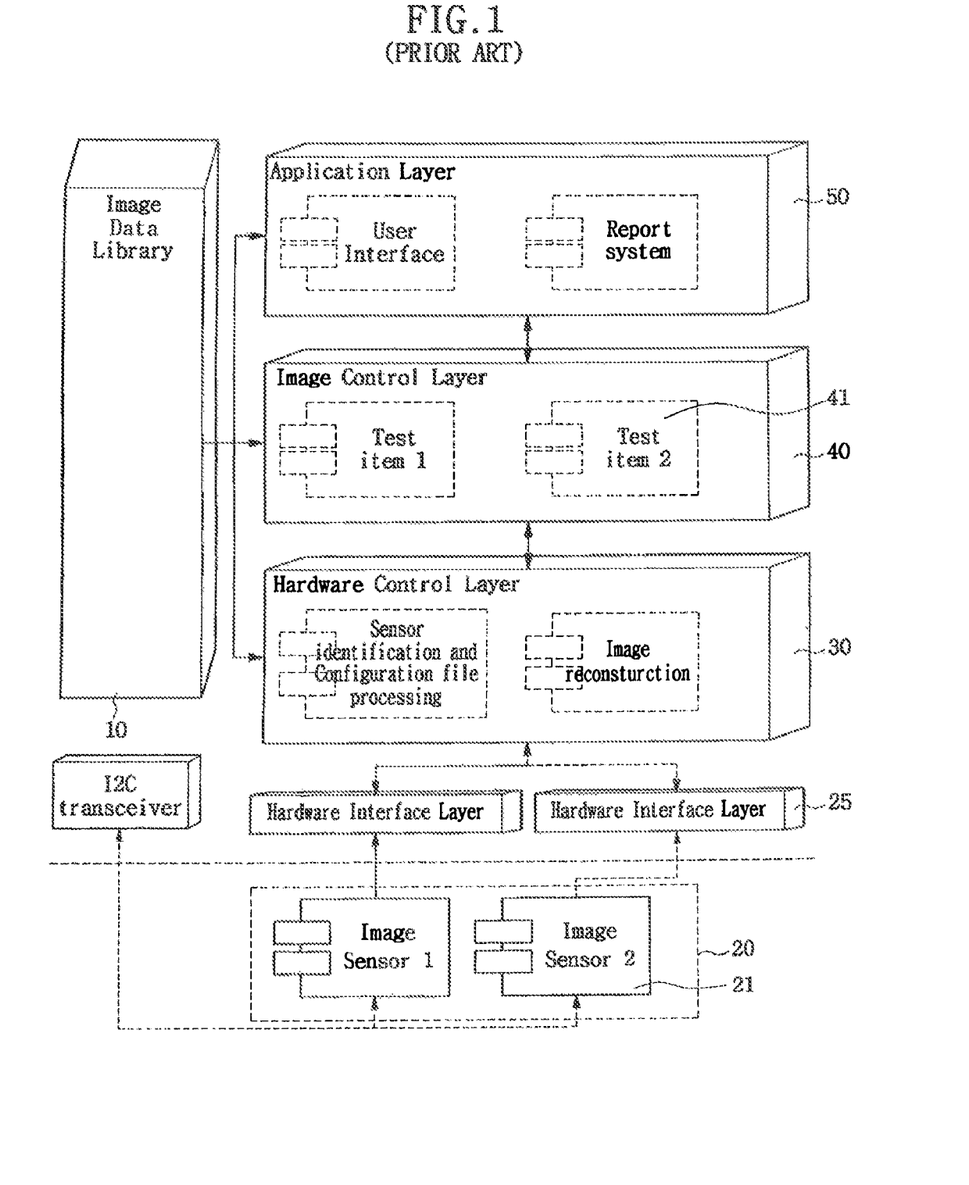
FIG. 1 is a block diagram illustrating the construction of a conventional test apparatus to test image data.

FIG. 1 illustrates the construction of a conventional test apparatus to test image data.

Referring to FIG. 1, a conventional test apparatus to test image data includes a sensor group 20 constituted by a plurality of sensors 21 capable of sensing external image data, and an image data library 10 in which a large amount of image data is pre-stored.

In addition, the sensor group 20 is connected to a hardware control layer 30.

Here, the sensor group 20 is connected to the hardware control layer 30 via a hardware interface layer 25 to perform communication and transmit electrical signals therebetween.

The hardware control layer 30 functions to acquire image data from the sensor group 20. The hardware control layer 30 is connected to an image control layer 40. The image control layer 40 is constituted by a plurality of test items 41. The test items 41 have test elements pre-set to test the image data. The image control layer 40 is connected to an application layer 50.

The application layer 50 can output the image data tested in the image control layer 40 to a user as visual data.

Hereinafter, operation of the conventional test apparatus to test image data will be described.

Referring to FIG. 1, the hardware control layer 30 receives image data from the image data library 10 or the sensor group 20. Therefore, the hardware control layer 30 can acquire the image data.

Then, the hardware control layer 30 transmits the acquired image data to the test items 41.

The test items 41 compare the received image data with the pre-set test elements to perform a series of calculations to determine whether the acquired image data corresponds to the pre-set test elements.

Next, the respective test items 41 output the determination results as visual display results through the application layer 50.

However, in recent times, the number of pixels of the image data has been increased to perform high resolution, higher than the number of pixels in low resolution.

In this case, although the number of pixels is increased, the test items 41 compare the high-resolution image data with the pre-set test elements through the same calculations as the previous low-resolution image data to determine whether the image data corresponds to the pre-set test elements.

Therefore, the test items 41 have calculation regions increased to a certain level to calculate the high-resolution image data.

Therefore, in the conventional art, as the number of calculation regions are increased, the calculation time consumed by the test items 41 may be increased more than a desired level.

In addition, the conventional test items 41 perform a test using an image in which a plurality of frames is averaged. Therefore, since the results through the test items 41 are confirmed by a user as the average results, individual image data may not be confirmed when the tested image data is confirmed in order to perform failure analysis.

SUMMARY

Example embodiments provide an image data test unit capable of adding a queue structure between a hardware control layer and an image control layer to desynchronize a process of acquiring image data and a process of calculating the image data to effectively reduce a calculation time consumed by testing the image data, an image apparatus having the same, and a method of testing image data using the same.

Example embodiments also provide an image data test unit capable of adding queue structures to a plurality of test items included in an image control layer to store image data having individual frames, and thus, readily confirming the individual image data upon failure analysis of the image data, an image apparatus having the same, and a method of testing image data using the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image data test unit including a data acquisition unit configured to acquire image data having individual frames, an image data temporary storage unit configured to receive the acquired image data from the data acquisition unit to store a certain amount of the image data, and a test calculation unit configured to sequentially receive the image data from the image data temporary storage unit to store a certain amount of the image data, and compare the stored image data with preset test elements.

Here, the data acquisition unit may be electrically connected to an image data input unit to receive the image data.

In addition, the image data input unit may include a sensor module having sensors configured to sense image data from the exterior, and an image data library in which a certain amount of image data is pre-stored.

Further, the test calculation unit may include a plurality of test items in which the test elements are pre-set, and temporary storage units provided in the test items to receive the image data from the image data temporary storage unit and store a certain amount of image data, respectively.

Furthermore, the temporary storage units may sequentially receive the image data from the image data temporary storage unit.

In addition, the temporary storage units may sequentially receive the image data, and the image data may be simultaneously received at predetermined time intervals.

The temporary storage units may simultaneously and sequentially receive the image data from the image data temporary storage unit.

Further, the temporary storage units may be arranged in a certain sequence, and the image data from the image data temporary storage unit may be sequentially transmitted to the temporary storage units according to the arranged sequence.

Furthermore, the test calculation unit may be connected to an image data output unit configured to output image data compared with the pre-set test elements depending on frames.

The foregoing and/or other aspects of the present general inventive concept may also be achieved by providing an image apparatus including an image data input unit including a sensor module having sensors configured to sense image data from the exterior and an image data library in which a certain amount of image data is pre-stored, and into which image data having external individual frames is input, and an image data test unit including a data acquisition unit configured to acquire the image data, an image data temporary storage unit configured to receive the acquired image data from the data acquisition unit and store a certain amount of the image data, and a test calculation unit configured to sequentially receive the image data from the image data temporary storage unit to store a certain amount of the image data and compare the stored image data with pre-set test elements.

Here, the test calculation unit may include a plurality of test items having the pre-set test elements, and temporary storage units provided in the test items to receive the image data from the image data temporary storage unit and store a certain amount of the image data, respectively.

In addition, the temporary storage units may sequentially receive the image data from the image data temporary storage unit.

The foregoing and/or other aspects and utilities of the present general inventive concept may be achieved by providing a method of testing image data using an image data test unit including acquiring image data having individual frames from the exterior using a data acquisition unit; receiving the acquired image data from the data acquisition unit and storing a certain amount of the image data using an image data temporary storage unit, and sequentially receiving the image data from the image data temporary storage unit and storing a certain amount of the image data using a test calculation unit, and comparing the stored image data with pre-set test elements.

Here, the data acquisition unit may receive the image data from a sensor module having sensors configured to sense the image data from the exterior.

In addition, the data acquisition unit may receive the image data from an image data library in which a certain amount of image data is pre-stored.

Further, the data acquisition unit may simultaneously receive the image data from the sensor module having sensors configured to sense the image data from the exterior and the image data library in which a certain amount of image data is pre-stored.

Furthermore, the test calculation unit may include a plurality of test items having the pre-set test elements, and temporary storage units provided in the test items to receive the image data from the image data temporary storage unit and store a certain amount of the image data, respectively. The test items may receive image data from the temporary storage units and compare the image data with the pre-set test elements, respectively.

In addition, the temporary storage units may sequentially receive the image data from the image data temporary storage unit.

Further, the temporary storage units may sequentially receive the image data, and simultaneously receive the image data at predetermined time intervals.

Furthermore, the temporary storage units may be arranged in a certain sequence, and the image data from the image data temporary storage unit may be sequentially transmitted to the temporary storage units according to the arranged sequence.

In addition, the image data compared with the pre-set test elements may be output through an image data output unit connected to the test calculation unit according to frames.

Also, the acquired image data may be sequentially stored in the image data temporary storage unit.

The foregoing and/or other aspects and utilities of the present general inventive concept may also be achieved by providing an image apparatus that includes an image data temporary storage unit configured to receive image data from the image data acquisition unit and store a number of pre-set frames, wherein an amount of the image data stored in the image data temporary storage unit may be adjusted within a certain range according to a set magnitude of image data that is input. The set magnitude may be adjusted by a number of frames input through an input device.

The foregoing and/or other aspects and utilities of the present general inventive concept may also be achieved by providing a computer readable medium to contain computer-readable codes as a program to perform a method, the method comprising acquiring image data having individual frames from the exterior using a data acquisition unit, receiving the acquired image data from the data acquisition unit and storing a certain amount of the image data using an image data temporary storage unit, and sequentially receiving the image data from the image data temporary storage unit and storing a certain amount of the image data using a test calculation unit, and comparing the stored image data with pre-set test elements.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
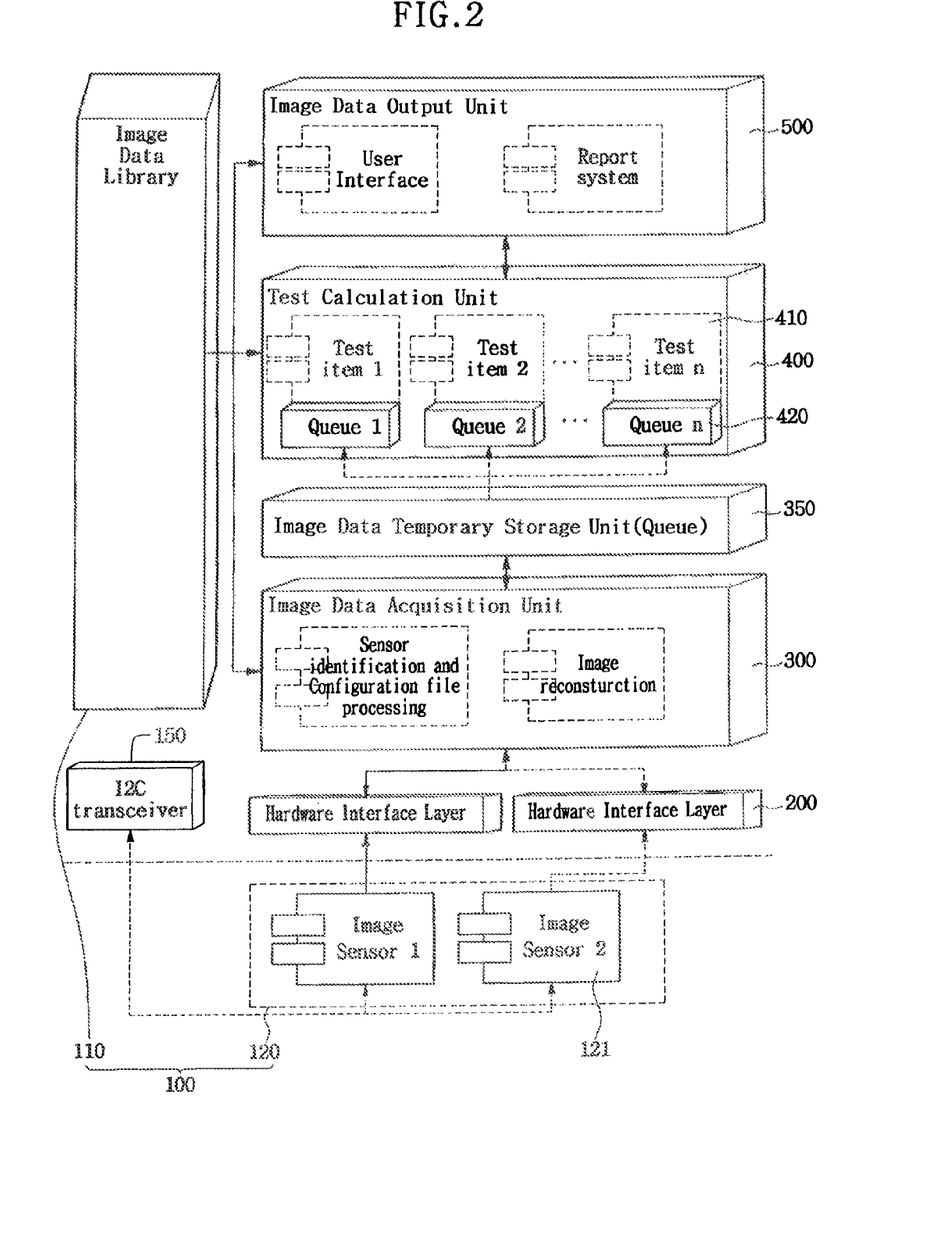
FIG. 2 is a block diagram illustrating an image data test unit in accordance with an example embodiment of the present general inventive concept.
Figure 3:
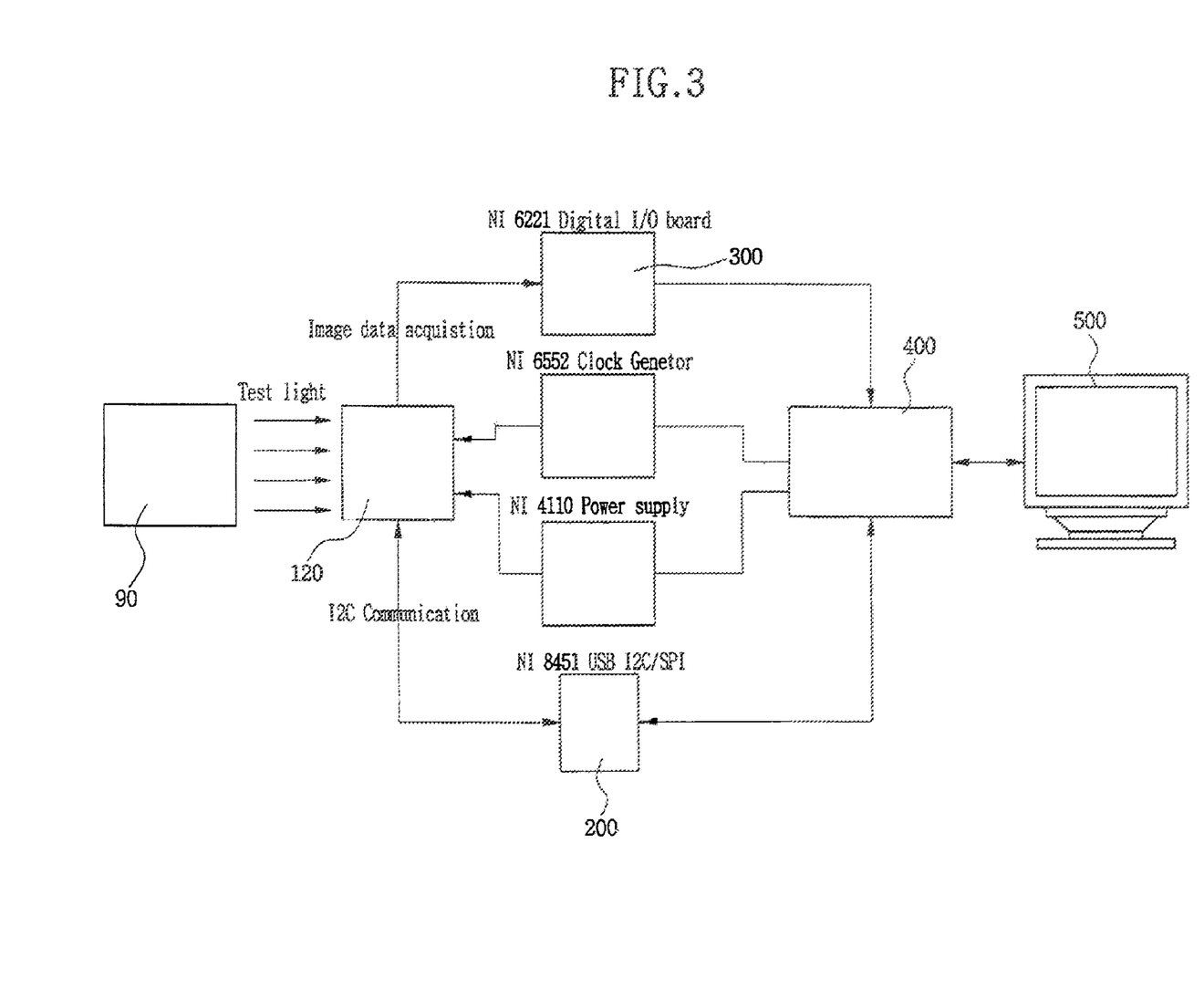
FIG. 3 illustrates the construction of an image apparatus having the image data test unit in accordance with an example embodiment of the present general inventive concept.

FIG. 2 is a block diagram illustrating the construction of an image data test unit in accordance with an example embodiment, and FIG. 3 illustrates the construction of an image apparatus having the image data test unit in accordance with an example embodiment.

First, the construction of the image data test unit in accordance with an example embodiment will be described.

Referring to FIG. 2, the image apparatus having the image data test unit in accordance with an example embodiment may include an image data input unit 100 having image data input from the exterior or by sensing the image data, an image data acquisition unit 300 to acquire the image data, a test calculation unit 400 to perform a series of tests on the image data, an image data temporary storage unit 350 disposed between the image data acquisition unit 300 and the test calculation unit 400 to temporarily store the image data and distribute the image data to the test calculation unit 400, and an image data output unit 500 to visually display results of the tested image data.

Referring to FIGS. 2 and 3, in the image apparatus having the image data test unit in accordance with an example embodiment, the image data acquisition unit 300 may employ an NI 6221 Digital I/O board such that image data can be extracted from a sensor module 120 of the image data input unit 100.

In order to adjust a master clock (MCLK) and control power between the sensor module 120 and the test calculation unit 300, an NI 6552 clock generator and an NI 4110 power supply may be used.

In addition, in order to perform communication between the sensor module 120 and the test calculation unit 300, a hardware control interface layer 200 may use an NI 8451 USB controller.

The above construction will be described in more detail below.

The image data input unit 100 may include a sensor module 120 and an image data library 110. The sensor module 120 may include sensors 121 to sense image data from the exterior. A certain amount of image data may be pre-set in the image data library 110. Here, the sensor module 120 may be connected to the image data acquisition unit 300 such as a hardware control layer via the hardware interface layer 200. An I2C transceiver unit 150 may be used to facilitate communication between the sensor module 120 and the hardware interface layer 200.

The image data library 110 may be connected to the test calculation unit 400 such as an image control layer.

The image data temporary storage unit 350 disposed between the image data acquisition unit 300 and the test calculation unit 400 may have a queue structure. The image data temporary storage unit 350 may receive image data from the image data acquisition unit 300 and store a certain amount of the image data. The certain amount may be a number of pre-set frames.

An amount of the image data stored in the image data temporary storage unit 350 may be adjusted within a certain range according to a set magnitude of image data that is input from the exterior.

The set magnitude may be adjusted by the number of frames input through a device such as an input device (not illustrated).

A plurality of test items 410 may be set in the test calculation unit 400. The number of the test items may be n.

The test items 410 may have test elements (not illustrated) pre-set to compare image data received from the image data temporary storage unit 350.

Here, the test items 410 may have a queue structure of temporary storage units 420, in which image data received from the image data temporary storage unit 350 is temporarily stored.

The temporary storage units 420 may have a certain number of frames that may be stored therein.

Here, the temporary storage units 420 may sequentially receive the image data from the image data temporary storage unit 350.

In addition, the temporary storage units 420 may sequentially receive the image data, and may be programmed to simultaneously receive the image data at predetermined intervals.

For example, at the beginning of a time interval, the image data temporary storage unit 350 may evenly and primarily transmit n image data to first through nth temporary storage units (queue 1 to queue n).

Then, after a certain time elapses, the image data temporary storage unit 350 may evenly and secondarily transmit another n image data to the first through nth temporary storage units (queue 1 to queue n).

Therefore, as described above, the image data temporary storage unit 350 may evenly and sequentially transmit the image data to the n temporary storage units 420.

In addition, the temporary storage units 420 may be sequentially arrayed, and the image data from the image data temporary storage unit 350 may be sequentially transmitted to the temporary storage units 420 according to the arrayed sequence.

That is, the image data may be sequentially transmitted from the image data temporary storage unit 350 to the first through nth temporary storage units (queue 1 to queue n) in the arrayed sequence. Here, the image data may be evenly transmitted from the image data temporary storage unit 350 to the first through nth temporary storage units (queue 1 to queue n) in the arrayed sequence.

In addition, image data may first be transmitted to the first temporary storage unit (queue 1) up to a storage amount thereof, and then, transmitted to the next temporary storage unit, for example, the second temporary storage unit (queue 2).

The storage amounts of the image data of the temporary storage units 420 may be adjusted within a certain range according to a set magnitude input from the exterior. The adjustment of the set magnitude of the temporary storage units 420 may be substantially the same as the adjustment of the set magnitude of the image data temporary storage unit 350, which is described above.

The image data output unit 500 may output image data after being compared with the pre-set test elements depending on the frames. Meanwhile, flow of the image data in the image data test unit in accordance with an example embodiment will be described with reference to FIGS. 2 and 6.

Figure 6:
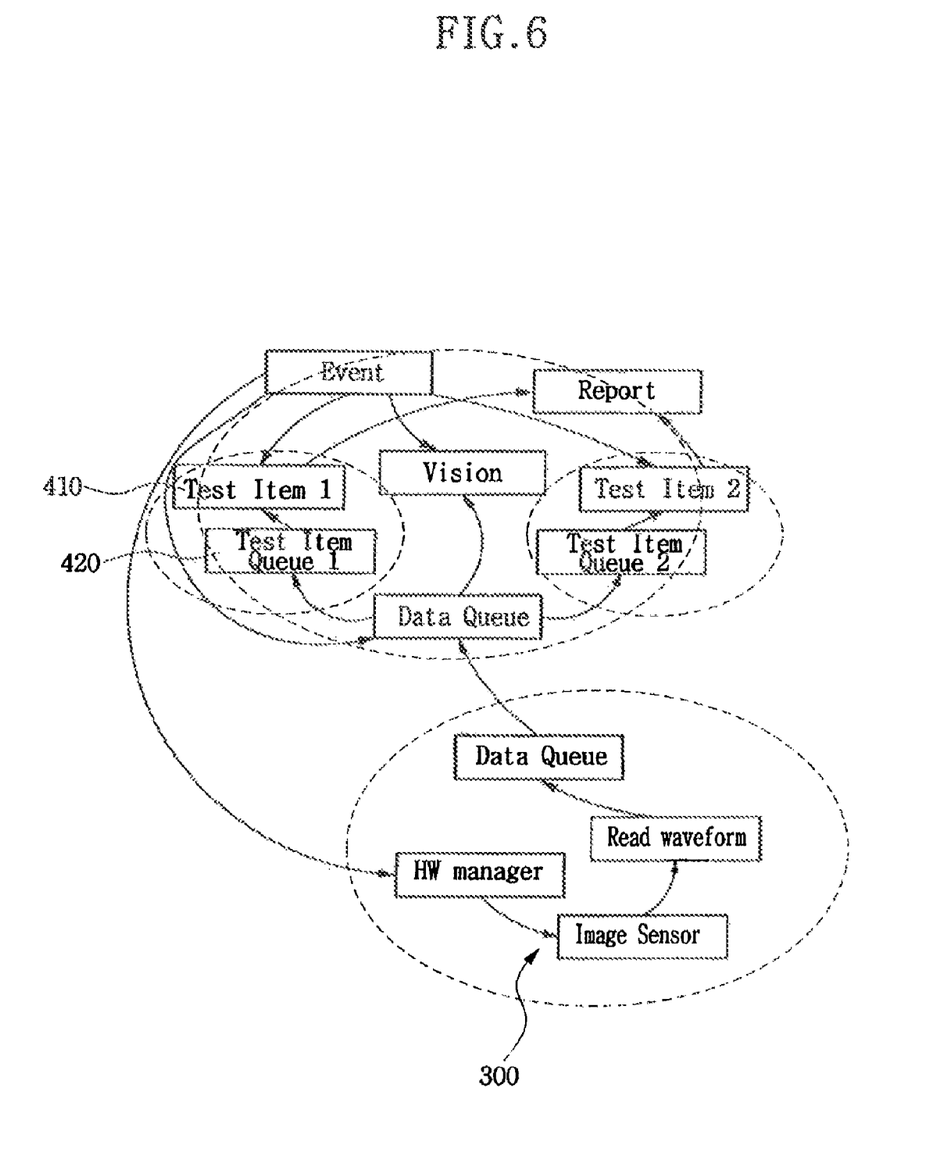
FIG. 6 is a diagram illustrating flow of image data of the image data test unit in accordance with an example embodiment of the present general inventive concept.

When an event is generated from the image data acquisition unit 300, the image data acquisition unit 300 and the test calculation unit 400 may be driven in a non-synchronized manner, and communication between them may be performed through the image data temporary storage unit 350 having a queue structure.

That is, a hardware (HW) manager of the image data acquisition unit 300 may drive a sensor module 120, and the sensor module 120 may read a waveform of the image data to store the image data to the image data temporary storage unit 350.

Then, the image data stored in the image data temporary storage unit 350 may be distributed to the temporary storage units 420 connected to the respective test items 410, and the distributed image data may be compared and calculated by the respective test items 410.

Results of the compared and calculated image data may then be reported

In addition, the event-generated data and the image data stored in the image data temporary storage unit 350 may be visualized to the exterior through a display device.

Figure 7:
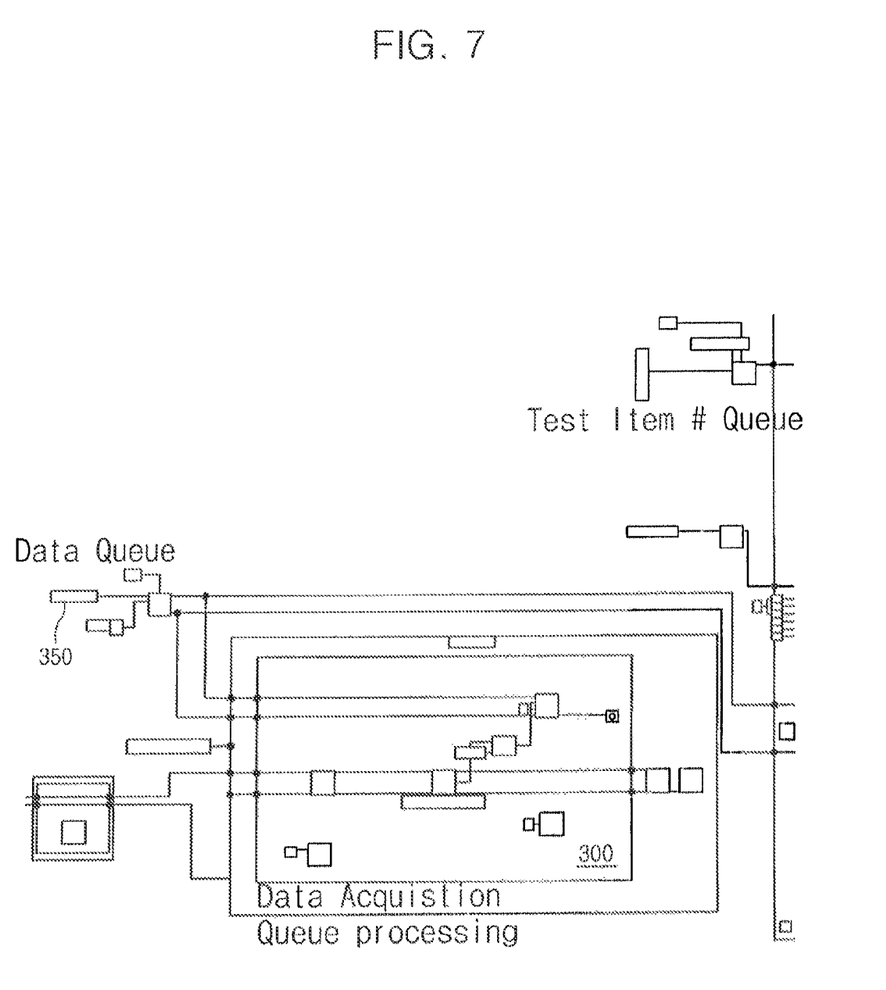
FIG. 7 is a diagram illustrating a queue process of image data transmitted to an image data acquisition unit in accordance with an example embodiment of the present general inventive concept.

Meanwhile, FIGS. 2 and 7 illustrate structure in which the image data acquisition unit 300 may be separated from the test calculation unit 400 using LabVIEW.

Therefore, "Data Acquisition Queue Processing" of the image data acquisition unit 300 may function to store the image data in the image data temporary storage unit (Data Queue) 350.

Figure 8:
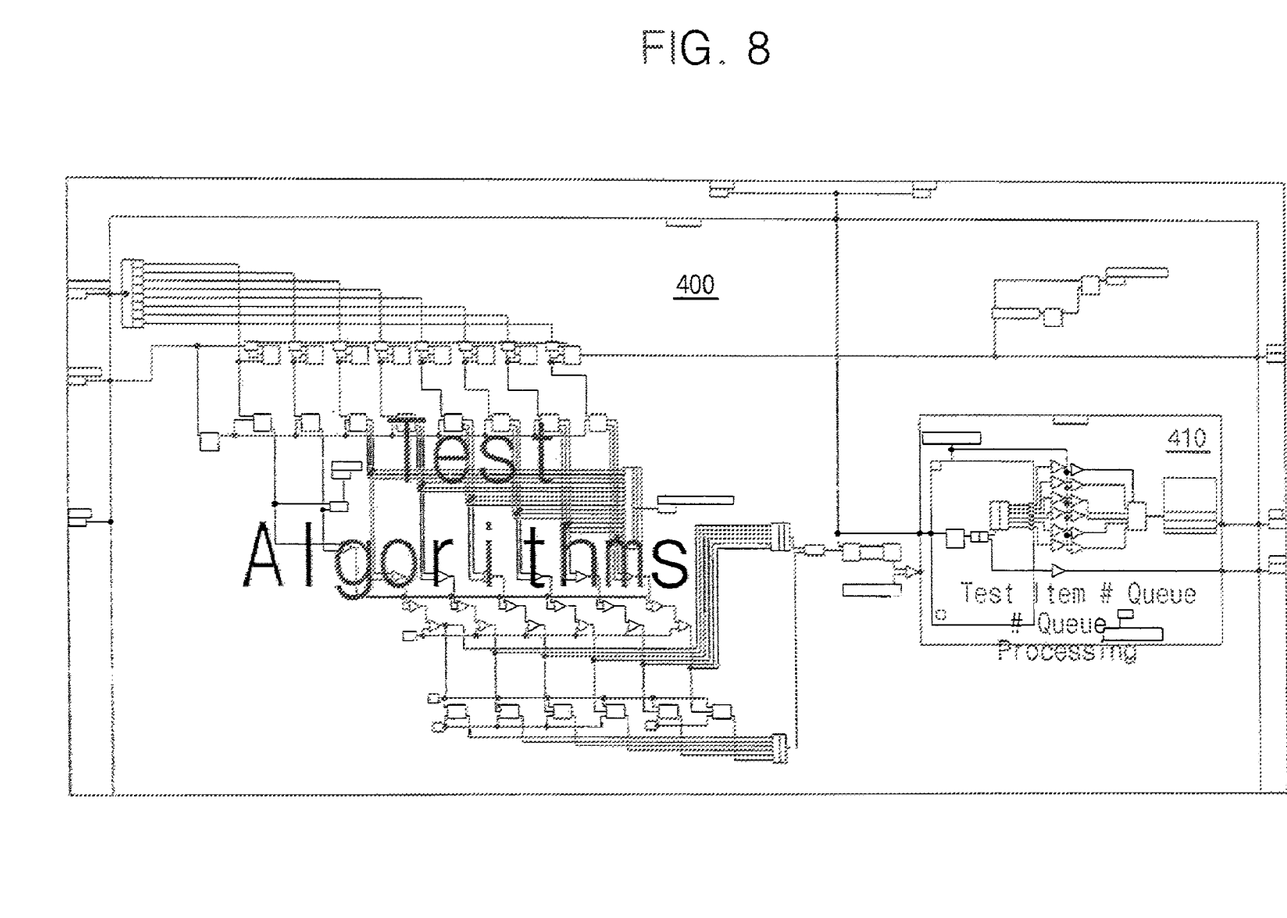
FIG. 8 is a diagram illustrating a queue process of image data in a test calculation unit in accordance with an example embodiment of the present general inventive concept.

Referring to FIGS. 2 and 8, the test calculation unit 400 may use queue structures depending on the test items 410, and restore the stored image data to the respective temporary storage units (Test Item Queue) 420 through the "Data Acquisition Queue Processing,"

Therefore, all image data used in the test may be stored in the corresponding temporary storage units 420, and the image data may be used for an image analysis operation.

In addition, the test calculation unit 300 may be configured to separately perform "Queue Processing" depending on the test items 410.

Next, a method of testing image data using an image data test unit in accordance with an example embodiment will be described.

Figure 4:
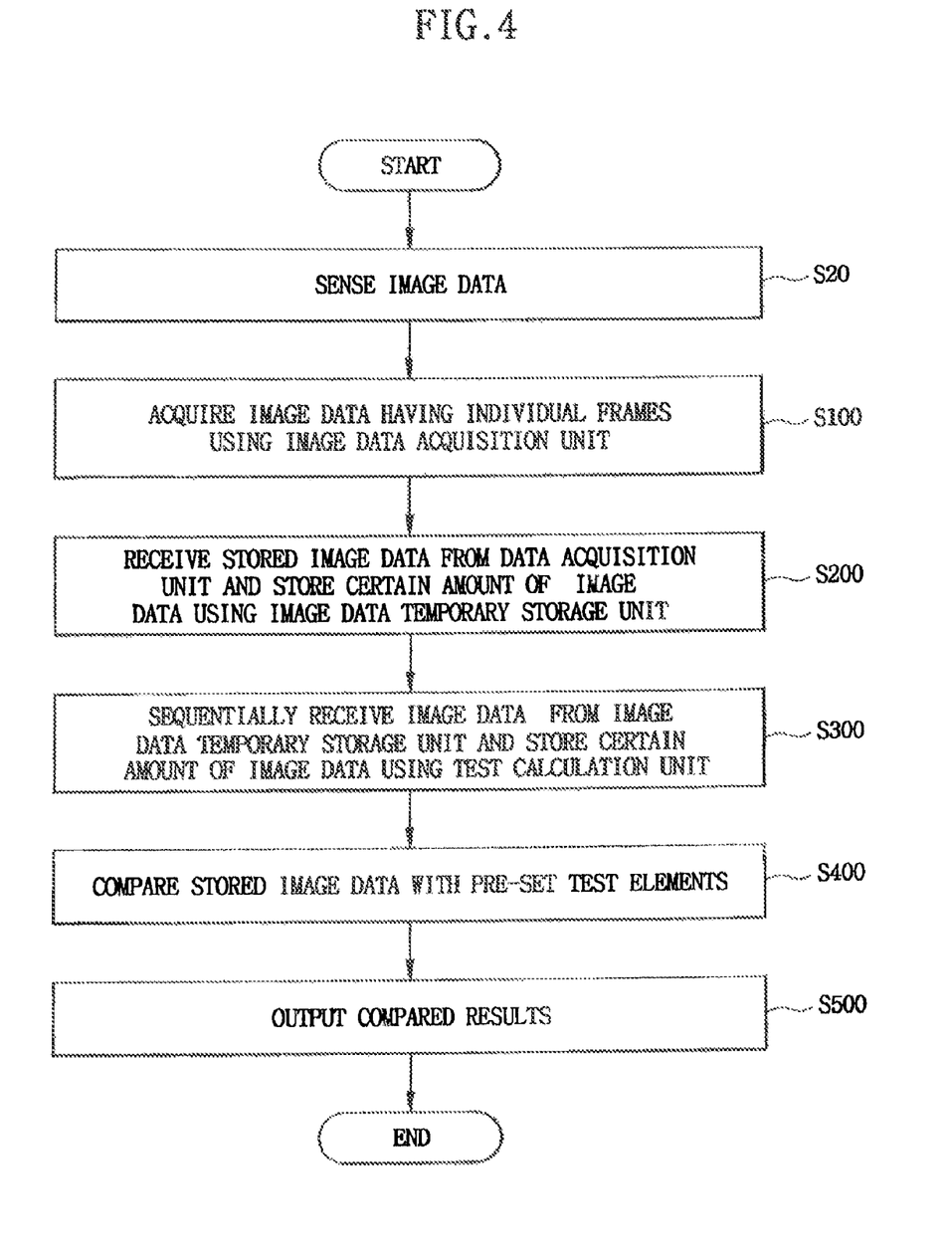
FIG. 4 is a flowchart illustrating a method of testing image data using an image data test unit in accordance with an example embodiment of the present general inventive concept.
Figure 5:
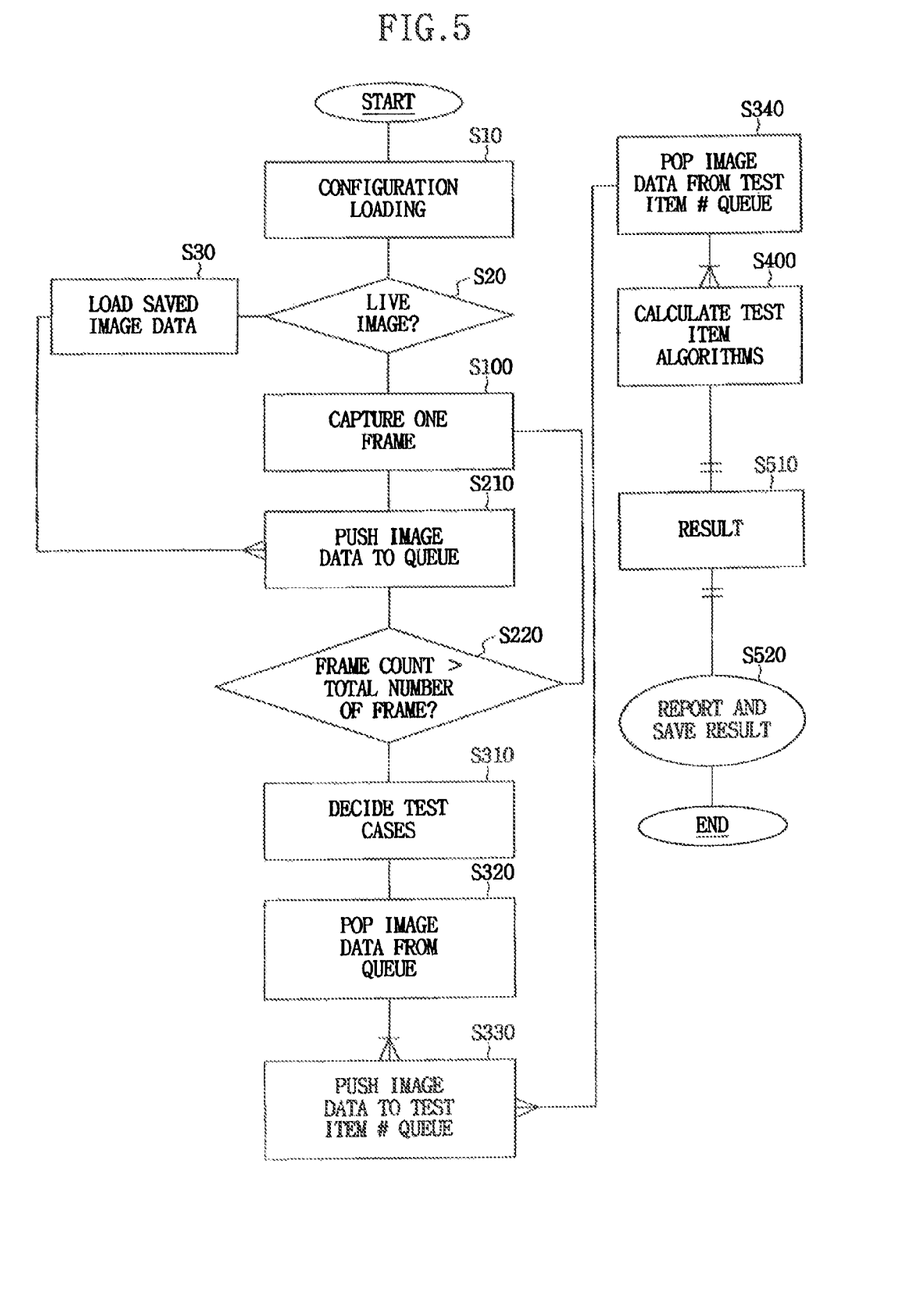
FIG. 5 is a flowchart illustrating another method of testing image data using an image data test unit in accordance with an example embodiment of the present general inventive concept.

FIG. 4 is a flowchart illustrating a method of testing image data using an image data test unit in accordance with an example embodiment, FIG. 5 is a flowchart illustrating another method of testing image data using an image data test unit in accordance with an example embodiment. FIG. 6 is a diagram illustrating flow of image data of the image data test unit in accordance with an example embodiment, FIG. 7 is a diagram illustrating a queue process of image data transmitted to an image data acquisition unit in accordance with an example embodiment, and FIG. 8 is a diagram illustrating a queue process of image data in a test calculation unit in accordance with an example embodiment.

Referring to FIG. 4, the method of testing image data in accordance with an example embodiment generally may include sensing image data as described in operation S20 acquiring the image data having an individual frame using an image data acquisition unit 300 as described in operation S100 receiving the stored image data from the image data acquisition unit 300 and storing a certain amount of the image data using an image data temporary storage unit 350 as described in operation S200 sequentially receiving the image data from the image data temporary storage unit 350 and storing a certain amount of the image data using a test calculation unit 400 as described in operation S300 comparing the stored image data with pre-set test elements as described in operation S400 and outputting the compared results through an image data output unit 500 as described in operation S500

The method will be described in more detail below.

Referring to FIGS. 2, 3 and 5, first, in order to set an environment of the image data test unit in accordance with an example embodiment, a configuration file may be downloaded from the exterior to initialize the environment of the image data test unit as described in operation S10.

Then, the sensor module 120 may sense image data from the exterior.

The image data may be provided by an external display device 90.

The image data acquisition unit 300 may sense whether there is live image data transmitted from the sensor module 120 as described in operation S20 That is, it is possible to determine whether there is image data sensed by the sensor module 120.

The image data acquisition unit 300 may receive image data pre-stored in an image data library 110, or may receive image data sensed by the sensor module 120.

In addition, while not illustrated, the image data acquisition unit 300 may receive image data from any one or both of the image data library 110 and the sensor module 120 through a selection unit (not illustrated).

When there is image data that can be received from the sensor module 120, the image data acquisition unit 300 may capture the image data by one frame at a time as described in operation S100 and store the captured image data in the image data temporary storage unit 350 as described in operation S210.

Therefore, the image data may be sequentially stored in the image data temporary storage unit 350.

At this time, the image data acquisition unit 300 may store the image data in the image data temporary storage unit 350 until the image data reaches a pre-set storage amount as described in operation S220. The storage amount may correspond to the number of the frames of image data.

Meanwhile, referring to FIGS. 5 and 7, when there is no image data that can be transmitted from the sensor module 120, the image data acquisition unit 300 may load image data pre-stored in the image data library 110 as described in operation S30. The loaded image data may be sequentially stored in the image data temporary storage unit 350.

At this time, the image data acquisition unit 300 may store the image data in the image data temporary storage unit 350 until the image data reaches the same pre-set storage amount as above.

When the pre-set storage amount is reached, the image data stored in the image data temporary storage unit 350 may be tested.

Then, referring to FIGS. 2, 5 and 8, the test calculation unit 400 may perform comparison and calculation operations of the plurality of test items 410.

First, after a test case is decided as described in operation S310, the image data temporary storage unit 350 may transmit the image data to a plurality of temporary storage units 420 respectively provided at the test items 410 as described in operations S320 and S330.

At this time, the temporary storage units 420 may sequentially receive the image data from the image data temporary storage unit 350. In addition, the temporary storage units 420 may simultaneously and sequentially receive the image data from the image data temporary storage unit 350.

That is, the image data may be evenly, simultaneously, and sequentially transmitted from the image data temporary storage unit 350 to the first through nth temporary storage units (queue 1 to queue n).

Further, the temporary storage units 420 may be sequentially arrayed, and the image data from the image data temporary storage unit 350 may be sequentially transmitted to the temporary storage units 420 according to the arrayed sequence.

That is, the image data may be sequentially transmitted from the image data temporary storage unit 350 to the first through nth temporary storage units (queue 1 to queue n) in the arrayed sequence.

Here, the image data may be evenly transmitted from the image data temporary storage unit 350 to the first through nth temporary storage units (queue 1 to queue n) in the arrayed sequence.

In addition, the image data may be transmitted to the first temporary storage unit (queue 1) to a storage amount thereof, and then, transmitted to the next temporary storage unit, for example, the second temporary storage unit (queue 2).

At this time, since each of the temporary storage units 420 has a certain pre-set storage amount, the image data temporary storage unit 350 may transmit the image data to the temporary storage units 420 until the image data is stored up to the storage amount of each temporary storage unit 420.

Then, independently arrayed test items 410 may sequentially receive image data from the temporary storage units 420 respectively connected thereto.

In addition, the test items 410 may receive image data from each of the temporary storage units 420, respectively, as described in operation S340, and compare and calculate the image date according to the pre-set test elements as described in operation S400.

Next, the test items 410 may transmit the comparison and calculation results according to the image data to the image data output unit 500 as described in operation S510.

Therefore, the image data output unit 500 may display the comparison and calculation results according to the image data to the exterior as described in operation S520.

At this time, the displaying of the results may be performed by an output means (not illustrated) such as a monitor through a user interface, or may be reported by a device such as a printer (not illustrated).

In addition, the test items 420 may transmit and store the comparison and calculation results according to the image data to the temporary storage units 420.

Therefore, the comparison and calculation results according to the image data stored in the temporary storage units 420 may be arbitrarily extracted through the image data output unit 500 to be displayed to the exterior.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Therefore, a queue structure is added between a hardware control layer and an image control layer to desynchronize a process of acquiring image data and a process of calculating the image data, thereby effectively reducing a calculation time consumed to test the image data. In addition, queue structures are added to a plurality of test items included in the image control layer to store image data having individual frames, respectively, thereby readily confirming individual image data upon failure analysis of the image data.

As can be seen from the foregoing, a queue structure as an image data temporary storage unit is added between a data acquisition unit such as a hardware control layer and a test calculation unit such as an image control layer to desynchronize a process of acquiring image data and a process of calculating the image data, thereby effectively reducing a calculation time consumed to test the image data.

In addition, queue structures such as temporary storage units are added to a plurality of test items included in the test calculation unit to store image data having individual frames, thereby readily confirming individual image data upon failure analysis of the image data.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of testing image data using an image data test unit, comprising:

acquiring image data having individual frames from an exterior of the image data test unit using a data acquisition unit;

receiving the acquired image data from the data acquisition unit and storing a certain amount of the image data using an image data temporary storage unit; and sequentially receiving the image data from the image data temporary storage unit and storing the certain amount of the image data using a test calculation unit, and comparing the stored image data with pre-set test elements.

2. The method according to claim 1, wherein the data acquisition unit receives the image data from a sensor module having sensors configured to sense the image data from the exterior.

3. The method according to claim 1, wherein the data acquisition unit receives the image data from an image data library in which a certain amount of image data is pre-stored.

4. The method according to claim 1, wherein the data acquisition unit simultaneously receives the image data from the sensor module having sensors configured to sense the image data from the exterior and the image library in which a certain amount of image data is pre-stored.

5. The method according to claim 1, wherein the test calculation unit includes a plurality of test items having the pre-set test elements, and temporary storage units provided in the test items to receive the image data from the image data temporary storage unit and store a certain amount of the image data, respectively, and each of the test items receives image data from the temporary storage units and compares the image data with the pre-set test elements.

6. The method according to claim 5, wherein the temporary storage units sequentially receive the image data from the image data temporary storage unit.

7. The method according to claim 6, wherein the temporary storage units sequentially receive the image data, and simultaneously receive the image data at predetermined time intervals.

8. The method according to claim 6, wherein the temporary storage units are arranged in a certain sequence, and the image data from the image data temporary storage unit are sequentially transmitted to the temporary storage units according to the arranged sequence.

9. The method according to claim 1, wherein the image data compared with the preset test elements are output through an image data output unit connected to the test calculation unit according to frames.

10. A non-transitory computer readable medium to contain computer-readable codes as a program to perform a method of testing image data using an image data test unit the method comprising:
  acquiring image data having individual frames from an exterior of the image data test unit, using a data acquisition unit;
  receiving the acquired image data from the data acquisition unit and storing a certain amount of the image data using an image data temporary storage unit; and
  sequentially receiving the image data from the image data temporary storage unit and storing the certain amount of the image data using a test calculation unit, and comparing the stored image data with pre-set test elements.

* * * * *